March 25, 1941.  J. S. GOOD  2,236,135
VISE
Filed May 27, 1938
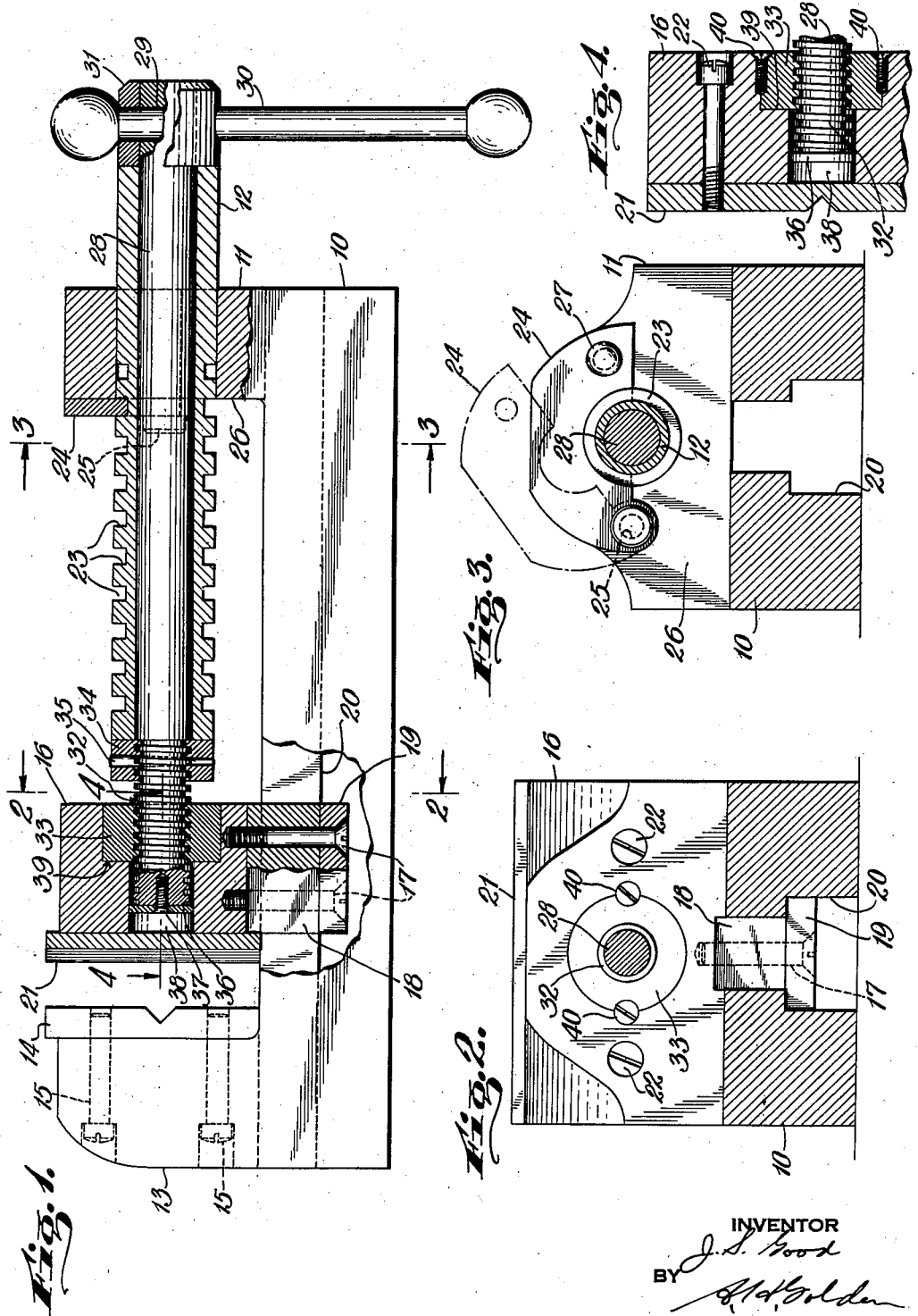
INVENTOR
J. S. Good
BY
ATTORNEY Patented Mar. 25, 1941

2,236,135

UNITED STATES PATENT OFFICE 2,236,135

VISE

Joseph S. Good, New Canaan, Conn., assignor, by mesne assignments, to Newman M. Marsilius, Bridgeport, Conn.

Application May 27, 1938, Serial No. 210,294

10 Claims. (Cl. 81—33)

This invention relates to a vise of the type in which it is possible to obtain a quick adjustment of the movable jaw.

While vises having a quick adjustment feature are admittedly old, they are generally so constructed as to be relatively expensive, or where inexpensive, are of such construction as to be undesirable. My invention contributes to the art a vise of the quick adjusting jaw type which is not only well constructed and easily operated, but is extremely simple to manufacture accurately, so that its cost is very low.

Basically, my vise embodies a movable jaw and a fixed jaw, with the movable jaw adjusted by a rotating shaft. This rotating shaft is mounted within a sleeve and is movable together with the sleeve relatively to a bearing ear fixed to the vise. In the prior art, it is customary to have a slidable sleeve which is readily movable into any one of a series of positions relatively to a bearing, the sleeve being readily secured in any of these positions. A rotating shaft is mounted within the sleeve in the prior art, but is movable longitudinally relatively to the sleeve through screw threaded engagement with the sleeve. It is this longitudinal movement relatively to the sleeve which is utilized to obtain final adjustment of the movable jaw.

On the other hand, I mount my rotatable shaft within my sliding sleeve so that the shaft is rotatable relatively to the sleeve, but may not move longitudinally relatively to the sleeve. I then utilize a screw threaded connection between the shaft and the movable jaw, and through this connection contribute longitudinal movement to the movable jaw. The advantages of this construction will appear obvious to those skilled in the art, since it is apparent that I am thus able to eliminate any internal screw threads in the longitudinally slidable sleeve.

Also, my sleeve may be circular, and is preferably circular, mounted for sliding movement within a bearing. In the prior art, the movable sleeve is generally formed with at least one flat surface of its equivalent, cooperable with a like surface or equivalent means on the bearing for maintaining the sleeve against rotation. Unlike the prior art devices, my sleeve may rotate relatively to its bearing and with the rotating shaft, this rotation being of no consequence, as will be understood. Since I can use a simple circular sleeve and a simple bearing, the cost of my device is thus considerably reduced.

A further feature of importance in my invention is the specific means whereby the screw threaded shaft engages an internally threaded block secured to the moving jaw, the novel feature of my invention residing in the assembly of the shaft to the movable jaw through this block, all as will be explained in detail in the specification.

A further feature of my invention resides in the manner in which I secure my rotating shaft against endwise movement relatively to the longitudinal sleeve. Another feature is the means for securing the movable sleeve relatively to its bearing against longitudinal movement, this last named means being especially important since it will be appreciated that considerable thrust is brought to bear on the longitudinally moving sleeve when work is clamped between it and the fixed jaw of the vise.

Other features of the construction will be pointed out in the specification which follows.

Referring now to the drawing, Fig. 1 is an elevation and partial section of my vise. Fig. 2 is a section taken along lines 2—2 of Fig. 1. Fig 3 is a view taken along lines 3—3 of Fig. 1, while Fig. 4 is a section taken along lines 4—4 of Fig. 1.

Referring now more particularly to the drawing, the base of my vise is designated by reference numeral 10, there being formed integrally with the base a bearing ear 11 in which is adapted to slide a sleeve 12, which in my invention may be circular so as to be capable of rotary as well as sliding movement within the bearing ear. As a matter of fact, the sleeve will not rotate in the operation of the vise, but should it do so, it will not affect the operation.

At the end of the base 10 opposite the bearing ear 11, there extends a fixed jaw 13 equipped with a removable face 14 held in position by a pair of screws 15. A movable jaw 16 has secured thereto by a pair of screws 17 a small substantially rectangular block 18, and a flat plate-like block 19, the two forming a dovetail, whereby the movable jaw is supported for sliding movement relatively to a dovetailed slot 20 milled out, or otherwise formed, in the base 10.

The movable jaw is equipped with a removable face 21 held in place by a pair of screws, one of which 22 is shown in Fig. 2, much in the same manner as the face 14 of the fixed jaw 13.

The sleeve 12 is equipped with a series of circular grooves 23 extending about the periphery thereof. A detent 24 is pivoted at 25 on the inward face 26 of the bearing ear 11, and has a pin 27 thereon whereby it may be readily moved in and out of any one of the grooves 23 on the periphery of the sleeve 12. In full lines in Fig. 3, and also in Fig. 1, the detent 24 is shown within one of the grooves 23. In broken lines in Fig. 3, the detent is shown out of one of the grooves 23 so that the sleeve is now ready for quick sliding into another position.

Within the sleeve 12 there is a shaft 28 which preferably extends at each end beyond the sleeve 12. At its right hand end, the shaft 28 is drilled out at 29 for a handle bar 30. The handle bar in turn secures to the shaft 28 a cap 31 which confines the shaft against movement in one direction relatively to the sleeve 12. It is of course understood that through the handle bar 30, the shaft 28 is readily rotated, or is moved longitudinally with the sleeve 12.

At its other end, the shaft 28 is screw threaded as at 32 for cooperation with an internally threaded block 33 secured to the movable jaw 16, as will be indicated later. Mounted also on the screw threads 32, although it is not essential that the mounting be on the screw threads, is a washer-like member 34 which through a pin 35 is pinned to the shaft 28. The washer 34 cooperates of course with the cap 31 for locking the shaft 28 against endwise movement in either direction within the sleeve 12.

The end of the shaft 28 has secured thereto a disk 36 through a screw 37. I shall now explain just how I assemble the threaded end 32 of the shaft 28 to the internally threaded block 33, and therefore to the movable jaw 16.

First, I thread the block 33 on to the shaft 32 until the end of the shaft protrudes through the block, as in Fig. 1. I then apply the disk 36 through screw 37 to the end of the shaft. I then insert the shaft 28, the disk 36 and the block 33 as a unit into a bore and counterbore 38, 39 in the movable jaw. A pair of screws 40 are then inserted into bores formed through cooperating surfaces of the internal block 33 and the movable jaw 16, the screws 40 acting of course to fasten the block 33 to the movable jaw so that it forms an integral portion of the jaw thereafter. It will now be quite obvious that rotation of the shaft 28 and its screw threaded portion will effect endwise movement of the movable jaw 16 through the internally threaded block 33.

It will be further understood that the plate 36 will maintain the shaft 28 against endwise separation from the movable jaw 16. It will be further appreciated that since it is the relative rotation between the shaft and the movable jaw which advances the movable jaw, it is immaterial whether or not the sleeve 12 rotates with the shaft 28, or remains stationary, it being merely important that the shaft 28 be not movable endwise relatively to the sleeve 12 which is maintained against longitudinal movement by the detent 24.

A further feature of importance to consider is the fact that the thrust of the sleeve 12 against the detent 24 is accepted by the face 26 of the bearing ear 11, thus making it unnecessary to rely on any particular form of mounting means for supporting the detent 24.

While I believe the operation of my new vise will be readily appreciated, I shall describe one clamping action to further emphasize the advantages of my construction.

A piece of work is placed between two faces of the fixed and movable jaws. The detent 24 is moved into its broken line position of Fig. 3 to release sleeve 12 for longitudinal movement with the movable jaw 16. The jaw 16 is moved up against the work or in fairly close relation to the work, and the detent 24 is dropped back into its full line locking position of Figs. 1 and 3. This allows for a quick adjustment of the movable jaw relatively to the work. Then, a quick turn of the handle bar 30 will rotate the shaft 28. Since the shaft 28, while rotatable, is locked against longitudinal movement, this rotation will, through the internally threaded block 33, adjust the movable jaw 16 solidly up against the work, the thrust of course being accepted by the detent 24 pressing against the face 26 of the bearing ear 11.

I now claim:

1. In a device of the class described, a fixed jaw, a bearing, a sleeve mounted for longitudinal sliding movement in said bearing, means for locking said sleeve to said bearing in any one of a plurality of positions, a shaft in said sleeve and means whereby it is locked against longitudinal movement relatively thereto, a portion of said shaft protruding beyond the end of said sleeve, a movable jaw, and screw threaded means of connection between said movable jaw and said protruding shaft whereby rotation of said shaft portion adjusts said movable jaw.

2. In a device of the class described, a fixed jaw, a bearing, a sleeve mounted for longitudinal sliding movement in said bearing, means for locking said sleeve to said bearing in any one of a plurality of positions, a shaft rotatable in said sleeve and means whereby it is locked against longitudinal movement relatively thereto, a portion of said shaft protruding beyond the end of said sleeve, said portion being screw threaded, a movable jaw, and a threaded portion in said movable jaw cooperable with said threaded shaft whereby rotation of said shaft adjusts said movable jaw.

3. In a device of the class described, a fixed jaw, a movable jaw, a bearing, a sleeve mounted for longitudinal sliding and rotary movement in said bearing, means for locking said sleeve against sliding relatively to said bearing in any one of a plurality of positions, a shaft in said sleeve and means whereby it is locked against longitudinal movement relatively thereto, a portion of said shaft protruding beyond the end of said sleeve, and screw threaded means of connection between said protruding shaft portion and said movable jaw whereby rotation of said shaft adjusts said movable jaw.

4. In a device of the class described, a fixed jaw, a bearing, a sleeve mounted for longitudinal sliding and rotary movement in said bearing, means for locking said sleeve against sliding relatively to said bearing in any one of a plurality of positions, a shaft rotatable in said sleeve and means whereby it is locked against longitudinal movement relatively thereto, a portion of said shaft protruding beyond the end of said sleeve, said portion being screw threaded, a movable jaw, and a threaded portion in said movable jaw cooperable with said threaded shaft whereby rotation of said shaft with or relatively to said sleeve adjusts said movable jaw.

5. In a device of the class described, a fixed jaw, a bearing, a sleeve mounted for longitudinal sliding and rotary movement in said bearing, means for locking said sleeve to said bearing in any one of a plurality of positions, a shaft in said sleeve and means whereby it is locked against longitudinal movement relatively thereto, a portion of said shaft protruding beyond each end of said sleeve, a shaft rotating member on one end of said shaft, the other end being screw threaded, a movable jaw, and a threaded portion in said movable jaw cooperable with the threaded end of said shaft, whereby rotation of said shaft adjusts said movable jaw.

6. In a device of the class described, a fixed jaw, a bearing, a sleeve mounted for longitudinal sliding movement in said bearing, a series of parallel grooves formed on the periphery of said sleeve at right angles to the longitudinal axis of said sleeve, a detent pivoted on said bearing on a pivot parallel to the longitudinal axis of said sleeve and movable on its pivot into and out of the said parallel grooves whereby to lock said sleeve against sliding in said bearing, at least one side of said detent lying against a surface of said bearing parallel to the said grooves whereby said surface accepts thrust against said detent in a direction towards said surface.

7. In a device of the class described, a fixed jaw, a bearing, a sleeve mounted for longitudinal sliding movement in said bearing, a series of parallel grooves formed on the periphery of said sleeve at right angles to the longitudinal axis of said sleeve, a detent pivoted on said bearing on a pivot parallel to the longitudinal axis of said sleeve and movable on its pivot into and out of the said parallel grooves whereby to lock said sleeve against sliding in said bearing, a shaft rotatable in said sleeve and means whereby it is locked against longitudinal movement relatively thereto, a portion of said shaft protruding beyond the end of said sleeve, said portion being screw threaded, a movable jaw, and a threaded portion in said movable jaw cooperable with said threaded shaft whereby rotation of said shaft adjusts said movable jaw.

8. In a device of the class described, a fixed jaw, a bearing, a sleeve mounted for longitudinal sliding movement in said bearing, means for locking said sleeve to said bearing in any one of a plurality of positions, a shaft rotatable in said sleeve, said shaft extending beyond each end of said sleeve, a collar fixed to said shaft on each end thereof and in juxtaposed relation to the ends of said sleeves whereby to lock said shaft against substantial endwise movement relatively to said sleeve, one end of said shaft being screw threaded beyond said collar, a movable jaw, and a threaded portion in said movable jaw cooperable with said threaded shaft whereby rotation of said shaft adjusts said movable jaw.

9. In a device of the class described, a fixed jaw, a movable jaw having a bore formed therein, a threaded shaft rotatable relatively to said fixed jaw, means holding said shaft against endwise movement relatively to said fixed jaw, an internally threaded block threaded on to said shaft, the end of said shaft and the said threaded block being insertible together into said bore, and means between said threaded block and jaw for fixedly securing said block in the said bore of the jaw to function as an integral part of said jaw thereafter.

10. In a device of the class described, a bearing block having a fixed jaw at one end and a bearing ear at the other end, the said block having also a bearing way for a movable jaw, a sleeve mounted for longitudinal sliding movement on said bearing ear, means for locking said sleeve against sliding movement relatively to said ear in any one of a plurality of positions, a shaft rotatable in said sleeve and means whereby it is locked against longitudinal movement relatively thereto, a portion of said shaft protruding beyond the end of said sleeve, said portion being screw threaded, and a threaded portion in said movable jaw cooperable with said threaded shaft whereby rotation of said shaft adjusts said movable jaw on the bearing way of said block and relatively to said fixed jaw.

JOSEPH S. GOOD.